Patented Feb. 3, 1948

2,435,537

UNITED STATES PATENT OFFICE 2,435,537

POLYVINYLIDENE FLUORIDE AND PROCESS FOR OBTAINING THE SAME

Thomas A. Ford, Wilmington, Del., and William Edward Hanford, Easton, Pa., assignors to E. I. du Pont de Nemours & Company, Wilmington, Del., a corporation of Delaware No Drawing. Application April 20, 1944, Serial No. 531,986

6 Claims. (Cl. 260—92.5)

This invention relates to new polymeric materials, and more particularly to polymers of vinylidene fluoride.

Vinylidene fluoride has long been regarded as a non-polymerizable compound. Swarts (Bull. Acad. Roy. Belgique 39, 383–414 (1901)) found that vinylidene fluoride was not polymerized by the prolonged action of sunlight, either when liquefied or when as a gas mixed with oxygen. The other vinylidene halides, such as vinylidene chloride, vinylidene chlorobromide, and vinylidene bromide, behave quite differently. They polymerize spontaneously when kept under ordinary pressures and temperatures, even in the absence of light and without added catalysts.

This invention has as an object the preparation of new polymeric materials of high molecular weight having a valuable combination of physical properties, including toughness, insensitivity to moisture, and a high degree of stability to heat and light. A further object is the production of new synthetic polymers having a relatively high elasticity of the type manifested in stiffness of film or flexual strength of molded bars, in combination with toughness as manifested by the high impact strength of formed articles. A still further object is the manufacture of polyvinylidene fluoride which is a tough thermoplastic material capable of being molecularly oriented. Still further objects reside in methods for obtaining these polymers. Other objects will appear hereinafter.

We have found that vinylidene fluoride can be polymerized to valuable high molecular weight heat stable polymers which produce strong films, fibers, and the like, and which are characterized by the fact that they are capable of being cold drawn to a high degree.

In order to produce these orientable polymers, which are distinguishable from the lower molecular weight unorientable polymers by the fact that the former is capable of being permanently elongated to an increase in length of at least 100%, the use of pressures above 30 atmospheres and temperatures of from 20° C. to 250° C. are necessary, even with a very active catalyst combination, such as, an inorganic peroxy compound in conjunction with an oxidizable sulfoxy compound of the type hereinafter described. With less active catalysts higher pressures than 40 atmospheres must be used. For example, with acyl peroxides, organic peracids, inorganic peroxy compounds (in the absence of an oxidizable sulfoxy compound), dialkyl dioxides, hydrazines, amine oxides, and molecular oxygen pressures in excess of 300 atmospheres are required.

The preferred general methods for making the present polymers are given below.

The polymerization is best carried out in a pressure vessel provided with means for heating and capable of withstanding pressures of at least 1000 atmospheres. Provision is made for agitating the contents of the reactor, and this is conveniently accomplished by imparting a shaking or rocking motion to the reactor as a whole. The reactor may be charged with the catalyst and monomer prior to the reaction, and additional quantities of any of the reaction ingredients may be added thereafter by injection through a suitable system of valves and connectors. The reaction system is advantageously provided with means of controlling and recording the internal temperature and pressure, and a safety device, such as a rupture disc, is desirable to insure that the safe operating pressure of the equipment is not exceeded. The use of an inert liquid medium such as water to aid in dispersing the catalyst and in controlling the reaction by dissipating the liberated heat is recommended.

One method of operation is to charge the reactor, before closing, with water sufficient to occupy one fourth to three fourths of the internal volume, a catalyst such as benzoyl peroxide in a proportion of 0.05% to 0.5% on the weight of monomer which is to be added, and any other ingredients such as promoters, modifiers, buffers, and dispersing agents. The vinylidene fluoride may then be charged as a gas under pressure through an inlet connection. Oxygen generally has an undesirable effect both on the rate of polymerization and on the properties of the polymerization product. Hence the oxygen content of the water and of the monomer employed should be reduced to a practical minimum, and care should be taken throughout the charging operations to exclude oxygen. The reactor may be swept with oxygen-free nitrogen and loaded under a blanket of nitrogen. After closing the reactor, the gas is preferably removed by evacuating the reactor to constant pressure before admitting the vinylidene fluoride. The reactor is then heated to between 50° and 150° C. Vinylidene fluoride under high pressure is admitted to the reactor; a pressure of 500 to 1000 atmospheres at about 80° C. is preferred. The start of the polymerization is evidenced by a drop in pressure within the reactor, and additional vinylidene fluoride is injected from time to time to maintain the pressure within the desired range. As the catalyst is used up, the reaction rate diminishes, and when it becomes unprofitably low the reactor is cooled, the excess pressure is released, and the vessel is opened and discharged. The vinylidene fluoride polymer is obtained from the reactor in the form of a powder or porous cake.

Another mode of operation is to sweep the empty reactor with oxygen-free nitrogen, close, evacuate, then admit an aqueous solution of the catalyst and any other water-soluble reaction ingredients before charging the monomer. For example, a dilute solution of an inorganic persulfate catalyst, e. g., ammonium persulfate, is admitted, followed by an aqueous solution of an oxidizable sulfoxy compound, e. g., sodium bisulfite. Monomeric vinylidene fluoride is then injected as before. With this catalyst system the preferred temperatures and pressures are not as high as in the case of the organic peroxide-catalyzed polymerization, and a temperature of about 30° C. and a pressure of about 40 atmospheres is highly satisfactory. Since the reaction proceeds rapidly even at considerably lower pressures, it is unnecessary to maintain a high pressure by continued injection of vinylidene fluoride, and around 80% of the monomer charged is polymerized within a few hours.

The polymeric product obtained from the reactor in powder, granular, or solid form may, if desired, be washed with water or other solvents or solution for the removal of catalyst residues, etc., and is dried by ordinary techniques.

The polyvinylidene fluoride, softens at temperatures within 145° to 160° C. and can be molded, pressed, flowed, or extruded into various shapes. The fused forms are transparent or translucent. The polymer is insoluble in most common solvents, such as hydrocarbons and alcohols, but is sufficiently soluble in a number of solvents to permit the preparation of excellent films by ordinary solvent casting techniques. Both pressed and solvent cast films have good stiffness and toughness and are not affected by aging. The present orientable polymer, in addition to the unusual properties previously referred to, is exceedingly stable to the action of heat and light. Other valuable properties of this polymer will become apparent from the following examples in which the parts given are by weight.

*Example I*

A reactor fabricated of stainless steel and designed to withstand a pressure in excess of 1000 atmospheres is flushed with pure oxygen-free nitrogen, and is charged with 50 parts of deoxygenated distilled water and 0.1 part of benzoyl peroxide. The water occupies approximately one-fourth of the total internal volume of the vessel. The reactor is then closed by a head, bearing an inlet valve and a thermocouple well, using an aluminum gasket at the point of closure. The nitrogen is removed by evacuating to constant pressure, and 40 parts of vinylidene fluoride is then admitted. The reactor is then placed in a reciprocating mechanism designed to produce vigorous agitation of the contents, and provided with external heating and cooling devices which can be operated both manually and automatically by a temperature recording and controlling instrument which is connected with the thermocouple measuring the internal temperature. The inlet valve is open to a water-filled system consisting of flexible connecting lines, a pressure gauge, and a rupture disc assembly constructed to blow out at a pressure slightly in excess of 1000 atmospheres. This system is connected through a valve to a source of pure deoxygenated water at a pressure of 1000 atmospheres.

Agitation and heating are begun, and when the internal temperature reaches 80° C. the internal pressure is raised to 790 atmospheres by injection of the requisite quantity of water from the high-pressure source. The temperature is maintained within the range 79°–81° C., and additional water is injected to bring the pressure to 950 atmospheres. As the polymerization takes place, the pressure in the reaction system falls, and additional water is injected as often as necessary to maintain the pressure within the range of 860 to 955 atmospheres. During 10.5 hours under the reaction conditions, there is a total observed pressure drop of 315 atmospheres. At the end of this time the pressure is no longer falling at an appreciable rate, indicating that the catalyst is exhausted and the reaction is complete. The reactor is then cooled, the unreacted portion of the vinylidene fluoride is bled off, and the water and polyvinylidene fluoride are discharged from the reactor. The powdery polyvinylidene fluoride (7 parts) thus obtained is washed with water and dried in vacuum.

The polyvinylidene fluoride obtained as described above can be oriented and cold drawn to an elongation of about 400%. The tensile strength of pressed films is about 4500 lbs./sq. in., based on the original dimensions. The bending stiffness of pressed films, expressed in terms of Young's modulus, is $7.7 \times 10^4$ lbs./sq. in. The sticking temperature, i. e. the temperature at which the film shows the first sign of sticking to a copper block when heated under a pressure of about 0.1 kg./sq. cm., is 145° C. The density of the pressed film is 1.745 g./cc. at 25° C. This polymer is soluble in isooctane, toluene, xylene, methanol, chloroform, and carbon tetrachloride. It can be dissolved in hot cyclohexanone, dimethyl formamide, and a number of other solvents and mixtures of solvents to give highly viscous solutions which, when poured on a smooth surface and freed of solvents by warming or evaporation, yield tough, transparent foils. The polymer can be pressed at 160° to 190° C. and quenched in ice water to give clear tough films which are resistant to tearing and do not shatter under sudden intensive shock or sharp flexing.

The remarkable stability of the above described orientable polyvinylidene fluoride to heat and light is illustrated by the fact that pressed films are not discolored or embrittled by six months' outdoor exposure at Wilmington, Delaware. The films can be heated at 200° C. for five minutes between aluminum foils without evidence of degradation. In the same test chlorine-containing polymers, such as vinylidene chloride polymers, are seriously degraded, developing a dark coloration and losing much of their tenactity. Heating at 275° C. for five minutes causes slight discoloration of the polyvinylidene fluoride films without adversely affecting the other properties such as toughness, whereas the chlorine-containing polymers derived from vinyl chloride or vinylidene chloride are completely degraded, leaving only a carbonaceous residue under these conditions.

*Example II*

A stainless steel, high pressure reactor similar to that employed in Example I is charged with 50 parts of water (occupying approximately onehalf of the total internal volume of the reactor), 0.5 part of borax, and 0.1 part of ammonium persulfate. The reactor is closed and evacuated to constant pressure to remove the nitrogen employed in sweeping the air from the apparatus prior to charging. The reactor is then placed in a reciprocating mechanism fitted with temperature controlling devices and connected to a vinylidene fluoride-filled system consisting of a pressure gauge and rupture disc assembly. This system is in turn connected through a valve to a storage vessel containing vinylidene fluoride under a pressure of approximately 1000 atmospheres. Agitating and heating are begun, and when the internal temperature reaches 80° C. the pressure is raised to 930 atmospheres by injection of vinylidene fluoride from the storage reservoir. During 1.1 hours at the reaction temperature of 80° C., there is an observed pressure drop of 125 atmospheres, by which time the reaction is essentially complete as indicated by the fact that no further drop in pressure occurs when the reaction system is repressured with vinylidene fluoride to 900 atmospheres and agitated for an additional 7 hours. The reactor is cooled, the unpolymerized vinylidene fluoride is bled off, and the polyvinylidene fluoride is discharged from the reactor, thoroughly washed with water, and dried.

The polyvinylidene fluoride obtained in accordance with the above example can be pressed at 200° C. to a film which can be oriented by cold drawing. The undrawn film of polyvinylidene fluoride shows an X-ray diffraction pattern characteristic of a crystalline solid, while the drawn polymer shows the typical diagram of a highly oriented fiber.

*Example III*

A stainless steel, high pressure reactor is swept with oxygen-free nitrogen and charged with 25 parts of deoxygenated water (occupying approximately one-fourth of the internal volume) and 0.5 part of borax. It is closed and evacuated to remove the nitrogen, and 0.044 part of oxygen is admitted. The reactor is then placed in a reciprocating agitator, fitted with temperature recording and controlling devices, and connected with a vinylidene fluoride injection system similar to that described in Example II. The reactor is heated to 140° C., and at this temperature the pressure is maintained within the range 725–980 atmospheres by intermittent injection of vinylidene fluoride from the high pressure storage vessel. During 8 hours at the reaction temperature, there is a total observed pressure drop of 265 atmospheres. After cooling and discharging the reactor, the polyvinylidene fluoride is obtained in the form of a white cake which is washed with water and dried in vacuum. The 9 parts of polyvinylidene fluoride so obtained is of excellent quality and can be pressed at 200° C. to a clear tough film having a sticking temperature of 143° to 148° C. and excellent cold-drawing properties.

Excellent yields of polyvinylidene fluoride at relatively low pressures and temperatures are obtained, as illustrated by the following example, through the use of an oxidizable sulfoxy compound in conjunction with a peroxy compound catalyst.

*Example IV*

A silver-lined, high-pressure reactor is swept with oxygen-free nitrogen and charged with 200 parts of deoxygenated distilled water. It is then cooled sufficiently to freeze the water, a mixture of 0.5 part of ammonium persulfate and 0.1 part of sodium bisulfite is added, the reactor is closed and then evacuated, care being taken to see that the catalyst is not dissolved before evacuation is complete. Fifty parts of vinylidene fluoride is admitted into the reactor with further cooling if necessary. The reactor is then placed in a reciprocating agitator and warmed to 40° C. under autogenous pressure. During a reaction period of 13 hours, the temperature is maintained within the range 40° to 46° C. At the end of this time very little pressure remains in the reactor, and after bleeding off the relatively small amount of unreacted vinylidene fluoride, the reactor is opened and the contents are discharged. The product, consisting of 35 parts of polyvinylidene fluoride is washed with water and dried in vacuum. The physical properties of this polymer are similar to those of the benzoyl peroxide-catalyzed polymer described in Example I, and the sticking temperature of the pressed film is 145° to 160° C.

The preferred catalysts, as previously indicated, are molecular oxygen and peroxy compounds, i. e., compounds containing the true peroxide grouping —O—O—. Examples of such compounds are diacyl peroxides, e. g., dibenzoyl peroxide, benzoylacetyl peroxide, and dipropionyl peroxide; alkyl peroxides, e. g., diethyl peroxide, tertiary butyl hydroperoxide and dipropyl peroxide; hydrogen peroxide; inorganic peroxides, e. g., barium peroxide, magnesium peroxide, and zinc peroxide, which are especially effective if used in conjunction with an anhydride of an organic acid; and peroxy acids or their salts, e. g., persulfuric acid, ammonium persulfate, potassium persulfate, potassium percarbonate, potassium perphosphate, and sodium perborate. Other polymerization catalysts which can be used in the practise of this invention include hydrazine salts, e. g., hydrazine sulfate and hydrazine sebacate, amine oxides, e. g., trimethylamine oxide; and organometallic compounds, e. g., lead tetraethyl, lead tetraphenyl, lithiumbutyl, silver acetylide, etc. The catalyst should be employed in an amount in excess of 0.005% (based on the total weight of monomer) of benzoyl peroxide or of its molecular equivalent of another catalyst, and preferably there is employed between 0.05% and 2%, and not more than 5%, of the catalyst. Although oxygen in amounts of 100 to 5000 P. P. M., based on the weight of monomer, can be used as a catalyst for the polymerization, less than 1000 P. P. M. of oxygen are preferred as larger amounts usually have a deleterious effect on the polymerization and on the properties of the polymer.

Promoters, although not necessary, can be used in conjunction with the catalysts to increase yield or to decrease the required time of reaction. Reducing agents, and especially oxidizable sulfoxy compounds are suitable promoters. By "oxidizable sulfoxy compound" is meant sulfur dioxide and compounds which contain a sulfur-oxygen linkage and which yield sulfur dioxide when treated with hydrochloric acid. Examples of such compounds are sodium bisulfite, sodium sulfite, ammonium bisulfite, sodium hydrosulfite, sodium thiosulfate, p-toluenesulfinic acid, formamidine sulfinic acid, condensation products of aldehydes with alkali metal bisulfites or hydrosulfites, dialkyl sulfites, etc. Such compounds can be employed in amounts ranging from 0.001% to 5%, based on the weight of monomer, to facilitate the polymerization. Other promoters which are useful include acetylenic alcohols, e. g., propargyl alcohol, and metal carbonyls, e. g., nickel carbonyl, iron carbonyl, etc.

The optimum pressure and temperature conditions in any one instance depend to a large extent on the catalyst or combination of catalysts employed. Thus, in the case of dialkyl dioxides, organic peroxy compounds, inorganic peroxy compounds (in the absence of an oxidizable sulfoxy compound), diacyl peroxides, hydrazines, amine oxides, and molecular oxygen pressures in excess of 300 atmospheres must be used for best results, while in system employing an inorganic peroxy compound in conjunction with a reducible sulfoxy compound satisfactory polymerization rates and yields of polymer are obtained employing pressures in the range of 30 to 50 atmospheres.

The temperature is adjusted to give a controllable rate of reaction, and the optimum temperature depends to a large extent on the catalyst employed. In general the temperature range is from 20° C. to 250° C. and temperatures of 30° C. to 150° C. are preferred. With systems comprising an inorganic peroxy compound activated by the presence of oxidizable sulfoxy compounds (e. g., persulfate-bisulfite) temperatures of 30° C. to 125° C. are most suitable. Organic peroxides, e. g., diethyl peroxide and dibenzoyl peroxide, operate best in the range 50° to 150° C., while the other catalysts such as oxygen, the hydrazines, amine oxides, etc., generally are preferably employed at temperatures of 100° to 250° C.

A liquid polymerization medium, although not necessary, is beneficial, since it aids in dispersing the catalyst and in controlling the reaction temperature by dissipating the liberated heat. Water is especially useful for this purpose. With aqueous media, buffers or dispersing agents may be employed. Soaps, alkanesulfonic acids or their salts, sodium alkyl sulfates, quaternary ammonium salts containing a long hydrocarbon chain, alkyl betaines, long-chain primary alcohols, polyvinyl alcohol, etc., may be used in this connection.

Inert organic liquid media, e. g., petroleum ether, benzene, or tert.-butyl alcohol, can be used in conjunction with or instead of water.

Many organic compounds react with the growing polymer chain through a process known as telomerization, and by using such modifiers as carbon tetrachloride, bromoform, methanol, etc., with or without inert diluents, it is possible to modify the properties of the high molecular weight orientable polymers and even to obtain radically different products of relatively low molecular weight (telomers). The degree of modification depends partly upon the nature of the modifier used, and partly upon the reaction conditions, e. g., relative concentration of modifier chosen. Oxygenated solvents, e. g., acetone, dioxane and methyl formate, give a very slight degree of modification as compared with the halogenated solvents, e. g., carbon tetrachloride.

The vinylidene fluoride employed should be reasonably pure and substantially free of oxygen. The apparatus must be constructed of materials capable of withstanding the pressure employed, and the polymerization chamber may be lined with any material, such as mild steel, stainless steel, silver, nickel, lead, aluminum, tantalum, platinum, palladium, beryllium, chromium, glass, porcelain, or enamel, which will not adversely affect the rate of polymerization or the quality of the product. It is preferably equipped with some means of providing agitation.

The polymerization reaction can be carried out either batchwise or as a semi-continuous or continuous process. One or more reactants may be added portionwise or continuously during the polymerization and the reactor can be discharged at intervals. One mode of operation comprises passing continuously vinylidene fluoride alone or in admixture with other reactants through a zone which is maintained at reaction conditions, and which is provided with baffles, stirrers, or other means of agitation. Continuous operation possesses many technical advantages, such as speed and economy of operation, accurate control of the reaction and of the proportions of reactants, and flexibility of operation.

The polymers of vinylidene fluoride described herein are adapted to a wide variety of uses because of their excellent combination of toughness and high thermal stability. For example, they can be shaped into films, fibers, foils, sheets, ribbons, bands, or rods, tubing and massive articles under elevated temperatures and pressures, or they can be applied as coatings to fabrics, leather cellulose derivative products, etc. In the form of films polyvinylidene fluoride is useful as a photofilm. Polyvinylidene fluoride can be used alone, or it can be mixed with, or it can be prepared in the presence of other ingredients such as cellulose derivatives, resins, plasticizers, modifiers, pigments, filling materials, dyes, etc. For certain electrical applications the polymer is well suited for the bonding of mica flakes into tough, coherent shapes. In some of these uses the polyvinylidene fluoride is advantageously combined with or prepared in the presence of plasticizers, modifiers, softeners, dyes, pigments, fillers, and natural resins, etc.

As many widely different embodiments of this invention may be made without departing from the spirit and scope thereof, it is to be understood that I do not limit myself to the specific embodiments thereof except as defined in the appended claims.

We claim:

1. A process for obtaining orientable polyvinylidene fluoride which comprises heating vinylidene fluoride at a temperature of from 20° C. to 250° C. under a pressure above 300 atmospheres in the presence of a peroxy compound as a polymerization catalyst.

2. The process set forth in claim 1 in which the temperature is from 50° C. to 150° C., and the catalyst is benzoyl peroxide.

3. The process set forth in claim 1 in which the temperature is from 100° C. to 250° C., and the catalyst is oxygen.

4. In a process for polymerizing vinylidene fluoride under elevated pressure and temperature and in the presence of a catalyst, the step which comprises heating the vinylidene fluoride under a pressure above 30 atmospheres at a temperature of from 30° C. to 125° C. in contact with a catalyst which is a mixture of ammonium persulfate and sodium bisulfite.

5. Polyvinylidene fluoride which is a tough, heat stable thermoplastic material capable of being cold drawn to permanent increase in length of at least 100%, and which when cold drawn exhibits molecular orientation in the direction of elongation.

6. Polyvinylidene fluoride which exhibits molecular orientation and which is a heat stable, tough thermoplastic material.

THOMAS A. FORD.
WILLIAM EDWARD HANFORD.

REFERENCES CITED

The following references are of record in the file of this patent:

UNITED STATES PATENTS

| Number | Name | Date |
|---|---|---|
| 2,183,602 | Wiley | Dec. 19, 1939 |
| 2,334,195 | Hopff et al. | Nov. 16, 1943 |
| 2,328,510 | Thomas | Aug. 31, 1943 |
| 2,362,094 | Renoll | Nov. 7, 1944 |
| 2,362,960 | Thomas | Nov. 14, 1944 |

FOREIGN PATENTS

| Number | Country | Date |
|---|---|---|
| 796,026 | France | Jan. 17, 1936 |

OTHER REFERENCES

Starkweather, article in Jour. Am. Chem. Soc. 56, 1870–4, (1934).

Mellor, "Modern Inorganic Chemistry," pages 352–354, published by Longmans, N. Y., 1930.

Goggin et al., article in Ind. Eng. Chem., March 1942, pages 327–332.

---

Certificate of Correction

Patent No. 2,435,537.   February 3, 1948.

THOMAS A. FORD ET AL.

It is hereby certified that error appears in the printed specification of the above numbered patent requiring correction as follows: Column 8, line 29, after the word "photofilm" and before the period insert *base*; and that the said Letters Patent should be read with this correction therein that the same may conform to the record of the case in the Patent Office.

Signed and sealed this 6th day of April, A. D. 1948.

[SEAL]

THOMAS F. MURPHY,
*Assistant Commissioner of Patents.* lecular orientation and which is a heat stable, tough thermoplastic material.

THOMAS A. FORD.
WILLIAM EDWARD HANFORD.

REFERENCES CITED

The following references are of record in the file of this patent:

UNITED STATES PATENTS

| Number | Name | Date |
|---|---|---|
| 2,183,602 | Wiley | Dec. 19, 1939 |
| 2,334,195 | Hopff et al. | Nov. 16, 1943 |
| 2,328,510 | Thomas | Aug. 31, 1943 |
| 2,362,094 | Renoll | Nov. 7, 1944 |
| 2,362,960 | Thomas | Nov. 14, 1944 |

FOREIGN PATENTS

| Number | Country | Date |
|---|---|---|
| 796,026 | France | Jan. 17, 1936 |

OTHER REFERENCES

Starkweather, article in Jour. Am. Chem. Soc. 56, 1870–4, (1934).

Mellor, "Modern Inorganic Chemistry," pages 352–354, published by Longmans, N. Y., 1930.

Goggin et al., article in Ind. Eng. Chem., March 1942, pages 327–332.

---

Certificate of Correction

Patent No. 2,435,537.     February 3, 1948.

THOMAS A. FORD ET AL.

It is hereby certified that error appears in the printed specification of the above numbered patent requiring correction as follows: Column 8, line 29, after the word "photofilm" and before the period insert *base*; and that the said Letters Patent should be read with this correction therein that the same may conform to the record of the case in the Patent Office.

Signed and sealed this 6th day of April, A. D. 1948.

[SEAL]

THOMAS F. MURPHY,
*Assistant Commissioner of Patents.*